Jan. 2, 1934.  R. W. REGENSBURGER  1,941,954
EGG PACKING
Filed March 2, 1931
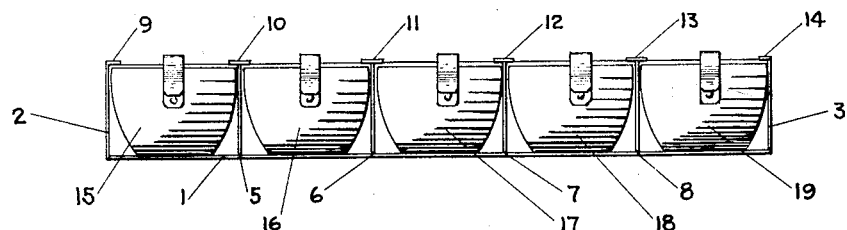
Fig.-1
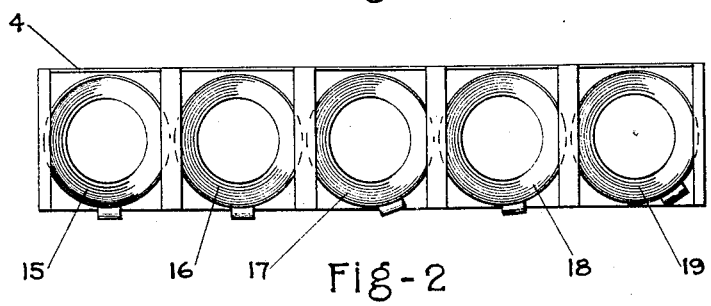
Fig.-2
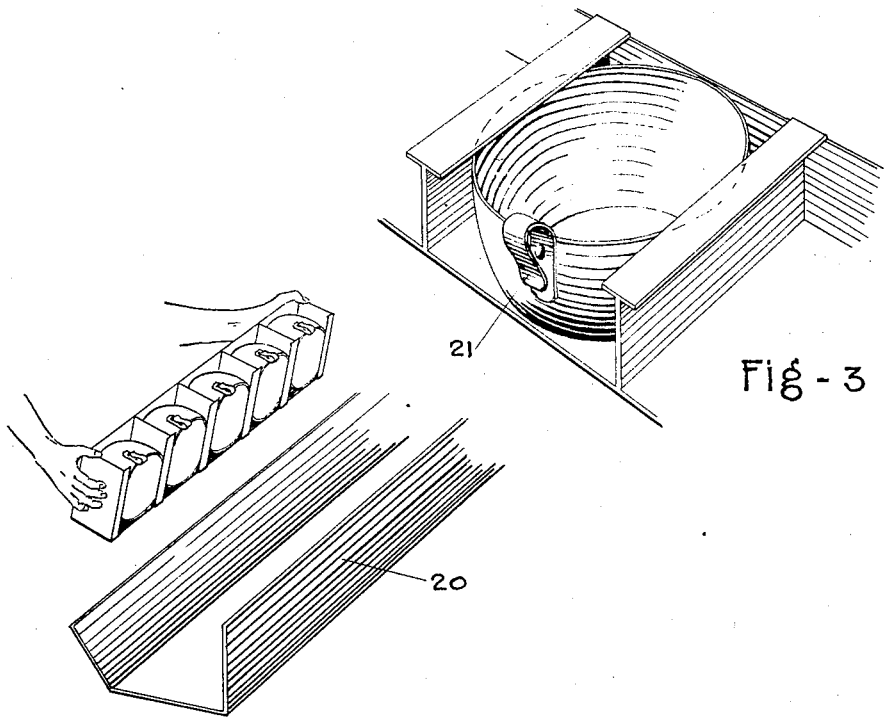
Fig-3
Fig-4

Patented Jan. 2, 1934

1,941,954

UNITED STATES PATENT OFFICE 1,941,954

EGG PACKING

Richard W. Regensburger, Chicago, Ill., assignor, by mesne assignments, to Industrial Patents Corporation, Chicago, Ill., a corporation of Delaware Application March 2, 1931. Serial No. 519,660

3 Claims. (Cl. 146—2)

My invention relates particularly to means employed in packing the contents of eggs after removal from the shell. One of the objects of my invention is to provide a device that facilitates a speedy inspection of egg contents and renders such inspection feasible. Other objects of my invention will be given from the description which follows. In the accompanying drawing, hereby made a part of this specification, similar characters of reference identify similar parts in several figures. Referring now to the drawing:

Figure 1 is a front view showing a plurality of cups in a proper rack.

Figure 2 is a plan view of Figure 1.

Figure 3 is a detail in perspective showing a single cup held in its proper compartment.

Figure 4 is a perspective view showing the manner of dumping the contents of a rack of cups into a trough.

It will be noted that I provided a rack having a horizontally extending bottom 1, vertically and transversely extending ends 2 and 3, and vertically and longitudinally extending back 4, being open at the front. The five cup racks shown provided with compartment provisions have equally spaced partitions provided by vertically and transversely extending members 5, 6, 7 and 8 and transversely extending retaining flanges 9, 10, 11, 12, 13 and 14 constituting overhangs provided at the top of the vertically and transversely extending ends 2 and 3 and partitions 5, 6, 7 and 8. The cups 15, 16, 17, 18 and 19 are inserted through the open front as may be clearly seen by reference to Figure 3. When used in connection with a device such as is shown in my copending application entitled "Method and means for packing eggs", filed March 2, 1931, Serial #519,658, the egg breakers place a rack of cups in front of the egg breaking device and one egg is broken into each cup. After all the cups are full the operation submits all of the eggs to visual and olfactory inspection by glancing at them and passing the cups beneath the nose. Any cup that contains an egg to be rejected is removed by withdrawing that cup by a forward movement from the rack. After inspection the entire rack is then tipped as shown in Figure 4 as by moving the front of the rack in an upward and rearward direction thereby simultaneously dumping along unobstructed paths the contents of all of the cups into a proper trough as 20. It will be noted that the cups here shown are conventional cups provided with a conventional handle 21. It will also be noted that the transversely extending flanges or overhangs 9, 10 etc. serve to engage opposite side portions of the top of each cup and thus retain the cups in place in the rack when the rack is tilted as herein described. During the tilting the cups are also retained in place because of the vertically and longitudinally extending back with which a rear portion of each cup engages. It will furthermore be noted that the rack is relatively long and holds several cups arranged in a row, that it is narrow and holds only one row of cups, that each cup compartment (for a cup which is circular in horizontal section) is substantially square, that the front of the rack is open and unobstructed and permits a ready removal from the front of the rack by a forward movement of any cup containing an egg to be rejected and that the top of the rack between the transverse flanges is open and permits a simultaneous dumping of all the cups from the rear top portion thereof along unobstructed paths.

My invention permits a ready inspection of eggs broken out through for packing as whole eggs or for separating the yolks from the whites, all those more particularly adapted for use in connection with the breaking out of whole eggs, inasmuch as the dumping of eggs into a trough is likely to rupture the membrane incasing the yolk rendering the eggs unfit for separation.

Instead of conventional cups, any other type of removable receptacles may be used with a suitably constructed rack. It will be understood that changes may be made in detail without departing from the spirit of my invention, as defined in the following claims.

I claim:

1. A relatively long, narrow cup retaining rack with cups of equal size therein for use in the inspecting of eggs, said rack comprising a horizontally extending bottom member, a vertically and longitudinally extending back member vertically and transversely extending ends and equi-distantly spaced vertically and transversely disposed partitions that divide the rack into a plurality of compartments of equal size for the reception of said cups to arrange them in a single longitudinally extending row, which compartments are substantially square in horizontal cross section, the ends of the rack having at their upper edges cup retaining flanges, and the partitions having at their upper edges cup retaining flanges, the top of the compartments between the respective flanges and the front of the compartments being open, the vertically and longitudinally extending back member being of such height that it does not extend upwardly beyond the rear edge of the cup, the rack construction being such that when the front of the rack is moved in an upward and rearward direction there can be accomplished a simultaneous dumping along unobstructed paths of the contents of all the cups.

2. A device for use in the inspecting of eggs comprising a relatively long and narrow cup retaining rack providing a series of longitudinally arranged cup receiving sections each for supporting a cup, and a single longitudinally extending row of cups, there being a cup supported by the rack in each cup receiving section thereof said rack being provided with retaining members which insure the retention of the cups in place when the forward longitudinal portion of the rack is tilted by being moved in an upward and rearward direction, the back portion of the rack being constructed so that there is not any portion thereof that overhangs or extends upwardly beyond the upper back rear edge of any of the cups, the construction of the cups and the rack being such that any of the cups can be removed from its receiving section on the rack by an unobstructed forward movement, the construction and arrangement also being such that when the rack is tilted in the manner described the contents of all of the cups in the row can be simultaneously discharged along unobstructed paths from the upper rear portions of the cups.

3. A device for the testing of eggs as defined by the claim last preceding in which each cup is provided with a handle at the front thereof to facilitate the removal and replacement of the cup from and into the front of the rack, and in which device the rack is provided with vertical and transversely extending members which serve in defining cup receiving compartments and which said members have overhangs at the top thereof that serve to engage the top side portions of the cups to hold the latter in place when the rack is being tilted, the rack having a longitudinally extending portion which extends upwardly for engagement by the rear of the cups in order to assist in supporting the latter when the rack is tilted, but which last mentioned longitudinally extending portion does not have any part that extends over or upwardly beyond the rearmost edges of the cups.

RICHARD W. REGENSBURGER.